Figure 1:
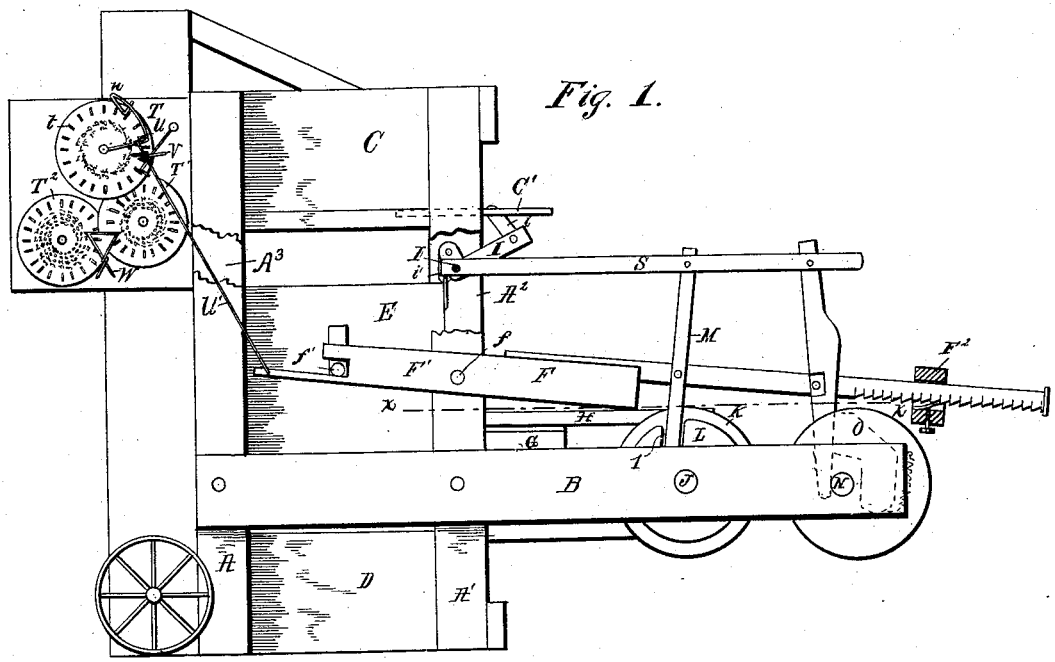

(No Model.) 2 Sheets—Sheet 1.

J. GUIDINGER.
AUTOMATIC GRAIN SCALE.

No. 378,363. Patented Feb. 21, 1888.

Witnesses.
W. A. Barnes.
Van Buren Hillyard.

Inventor:
Joseph Guidinger.
By R. S. & A. P. Lacey
Attys.

(No Model.) 2 Sheets—Sheet 2.
J. GUIDINGER.
AUTOMATIC GRAIN SCALE.
No. 378,363. Patented Feb. 21, 1888.
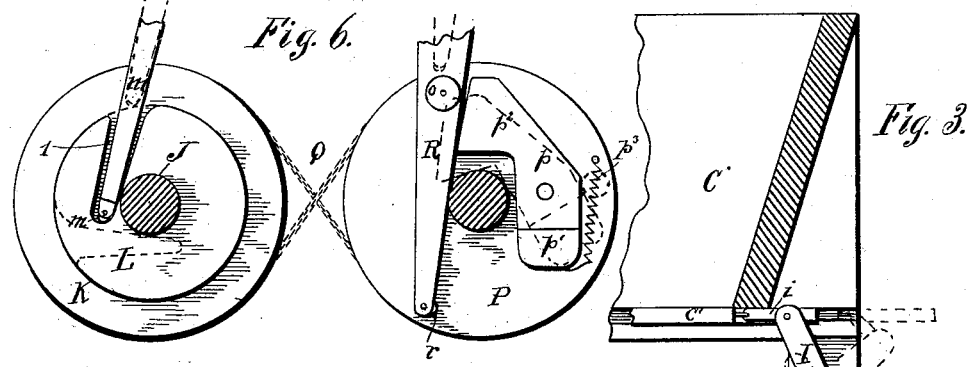
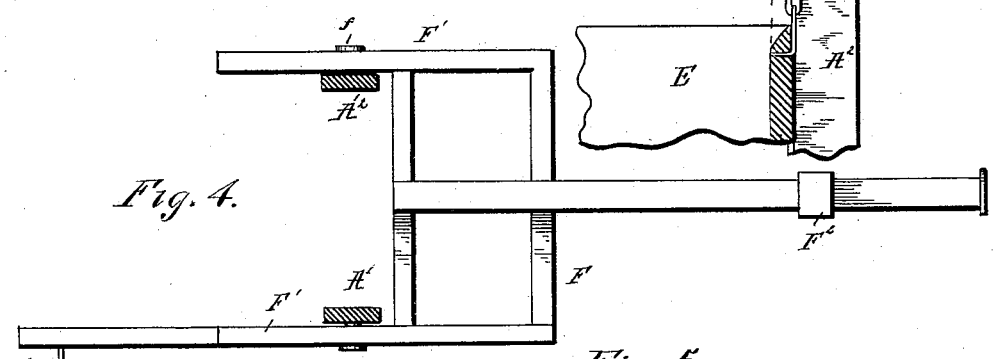
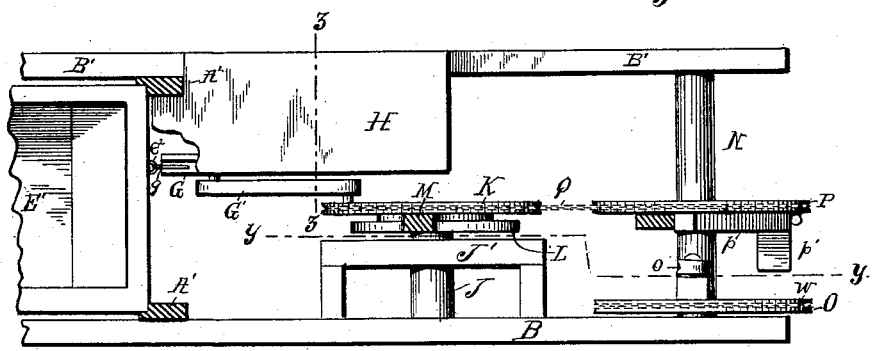
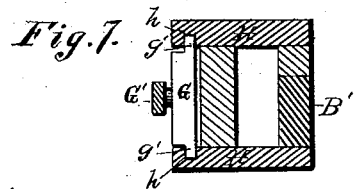
Witnesses.
M. A. Barnes
Van Buren Hillyard
Inventor:
Joseph Guidinger,
By R.S. & A.P. Lacey
Attys.

UNITED STATES PATENT OFFICE.

JOSEPH GUIDINGER, OF HIKA, WISCONSIN.

AUTOMATIC GRAIN-SCALE.

SPECIFICATION forming part of Letters Patent No. 378,363, dated February 21, 1888.

Application filed November 29, 1887. Serial No. 256,450. (No model.)

*To all whom it may concern:*

Be it known that I, JOSEPH GUIDINGER, a citizen of the United States, residing at Hika, in the county of Manitowoc and State of Wisconsin, have invented certain new and useful Improvements in Grain-Measures; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to grain-measures and tallies, and has for its object to produce a simple and compact mechanism for weighing grain in desired quantities, and at the same time automatically registering each quantity as it is measured off.

The grain box or measure is carried on the end of a scale-beam, and is adapted to rise and fall, and is provided with a sliding bottom. The grain bin or hopper from which the grain is delivered to the measure has a sliding bottom which is closed by the downward movement of the measure, with which it is connected by novel devices, and is opened by the upward movement of said measure. When the grain-measure has reached its lowest position, the bottom is slid open by a peculiar arrangement of mechanism, and when about to rise the same mechanism closes the bottom, which has a positive connection with the said mechanism at all times. The grain-measure is held at its lowest position against the counterbalancing force of the weight on the scale-beam and during the delivery of the grain into a sack or other receptacle by a system of appliances which forms an essential feature of my invention. A shaft having an idle pulley or wheel and a wheel tightly keyed thereto has a dog or lever pivoted to the wheel tightly keyed on the shaft, and a projection extending from the idler to engage with the dog or lever and lock the idler and said wheel together at the proper time to bring the mechanism for holding the measure down into operation. When the grain is discharged from the measure, a trip-arm carried by the scale-beam is projected within the path of the dog and disengages it from the projection on the idler and allows the measure to rise. The registering mechanism is operated from the scale-beam by novel connections.

The improvement consists in the novel features which hereinafter will be more fully described and claimed, and shown in the annexed drawings, in which—

Figure 2:
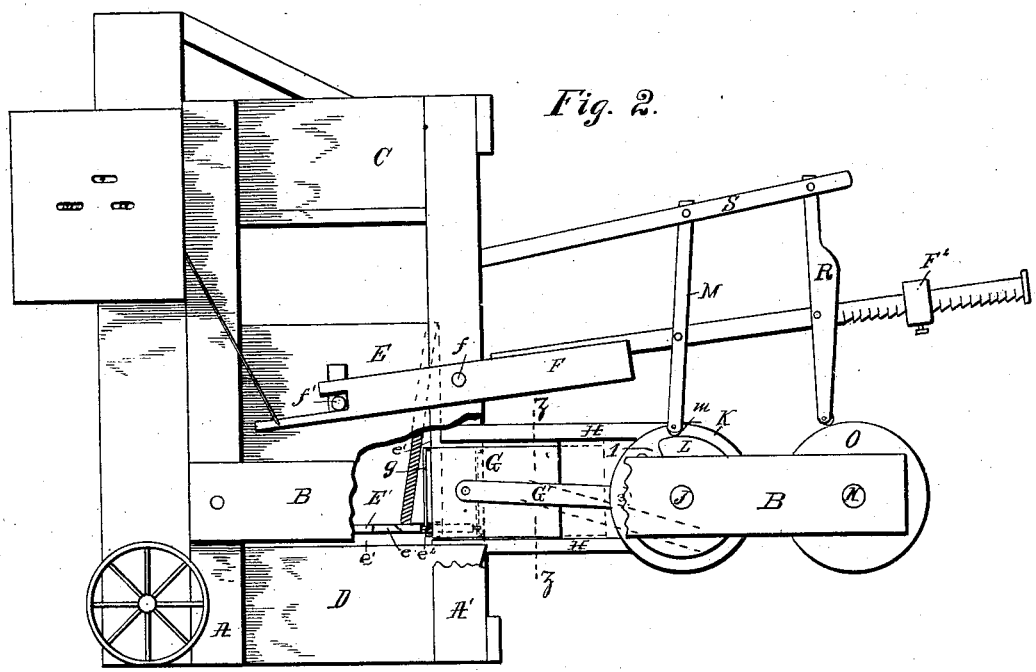

Figure 1 is a side view, parts being broken away, of a grain-measure of my invention, showing the measuring-vessel at its highest position; Fig. 2, a view similar to Fig. 1, but showing the measuring-vessel at its lowest position and the parts connected therewith correspondingly changed by full lines, and showing by dotted lines the slide in the bottom of the measure partly withdrawn. In this figure the registering mechanism is shown closed in. Fig. 3 is a detail side view of the devices which connect the measure with the sliding bottom of the hopper or bin, on an enlarged scale; Fig. 4, a top plan view of the scale-beam, showing its supports in section; Fig. 5, a detail view of the trip mechanism and the devices for holding the measure down and operating the slide in the bottom of the measure on the line X X of Fig. 1; Fig. 6, a view of the trip mechanism on the line Y Y of Fig. 5, on an enlarged scale, showing the operation of the parts by dotted lines; and Fig. 7, a cross-section of the cross-head guides on the line Z Z of Fig. 2.

The frame, composed of the four corner-posts A A' A² A³ and the horizontal side beams, B B', supports the grain bin or hopper C between the upper ends and the grain-chute D between the lower ends of the corner-posts. The measure or grain-box E, held between the corner-posts and carried on the inner end of the scale-beam F, is free to move up and down between the hopper and the chute. The sliding bottom E' of the measure works in grooves $e$ in the extensions $e'$ of the sides of the said measure, and is provided with the loop or eye $e^2$, to engage with the vertical guide-rod $g$, secured at its end to the cross-head G, which is adapted to travel back and forth in the guides H, being held between said guides by having flanges $g'$ fitting in grooves $h$ in the guides H.

The sliding bottom C' of the grain bin or hopper is connected with the measure E by the bell-crank I, mounted on the rod I', supported between the corner-posts A' and A², the link i connecting the upper end of the lever I with the bottom C' and the link i' connecting the lower end of lever I with the measure E. The inner end of the scale-beam F is separated or divided to form two branches, F', which embrace the corner-posts A' and A² and the measure E, and which are pivotally connected with the corner-posts A' and A² by the pivots f, forming the fulcrum of the beam, and have their ends notched to receive the gudgeons f', which project from the sides of the measure. The outer end of the scale-beam is graduated, and the weight F², adjustable on the beam, is to regulate the amount of grain to be measured. The short shaft J, journaled at one end in the side beam, B, and near its other end in the bracket J', fastened to the beam B, has the wheel K on the end projected beyond the bracket J'. To the side of wheel K, preferably the side next to the bracket J', is secured the disk L, concentric with wheel K and having the slot l, which is adapted to receive the lower end of the lock-bar M, secured to and depending from the scale-beam.

The shaft N, parallel with shaft J and journaled at its ends in the beams B and B', has the idle pulley or wheel O and the wheel P mounted thereon. The wheel P, keyed to shaft N and connected with wheel K by suitable contrivance—as the endless chain Q—has the dog or lever p pivoted to its side, and provided with an arm, p', which extends within the path of the projection o, extending laterally from the idler O. The other end, p², of the dog p is bent to rest against the shaft N and hold the arm p' in the path of projection o. The dog has a limited movement about its pivot, to permit the arm p' to be thrown out of the path of the projection o by the trip-arm R, attached to and depending from the scale-beam, and is held with its end p² resting against the shaft N by the spring p³.

The trip-arm R and the lock-bar M are pivotally connected with the scale-beam, and are extended above their pivots some distance, and are connected with the bar S, which is fastened at its inner end to the rod I'. By this arrangement considerable strain is removed from the scale-beam, which would otherwise have to be made heavy if the trip-arm and lock-bar were secured to it alone. The lower end of the lock-bar is provided with a roller, m, to relieve it from wear and reduce friction. The trip-arm has a roller, r, to relieve friction when the end of the arm is passing over the dog.

The registering mechanism, which is of ordinary construction, is composed of a series of gradutated wheels, T T' T², representing units, tens, and hundreds, respectively. The wheel T, having the teeth t, is moved forward by the spring-pawl U, which has one end mounted on the pivot of the wheel T and its other end extending up and bent to form the head n. The pawl U is connected with the scale-beam rod U'. The pointer V has an eye through which the rod U' works and is guided in its movements. The wheels T' and T² have their registering-numbers indicated by the double pointer W, which is made of a single wire, as shown.

The device is designed to be attached to a thrasher, and motion is communicated from any moving part of the thrasher by belt w to the idle-pulley O, which is continuously driven as long as the device is in operation. In starting to weigh or measure grain, the weight F² being properly adjusted to weigh the desired quantity and the parts being about in the position shown in Fig. 1, the slide C' being out, the lock-bar fitting in slot in disk L, and the trip-arm resting against the dog and holding it out of engagement with the projection o, the grain in the bin or hopper will escape into the measure until the weight is overbalanced. Now the measure falls or descends, closing bottom C' and elevating the lock-bar and trip-arm. The dog p, being free, is thrown into the path of the projection o of the idler O, and causes the idler and wheel P to revolve together. The wheel K being set in motion, the disk L travels under and supports the lock-bar during the discharge of the grain from the measure. This is essential; otherwise when the grain is partially discharged the measure would rise and prematurely open the slide C'. The moment the wheel K is set in motion the cross-head G is drawn back by the pitman G', which connects the cross-head and wheel K, and carries with it the slide E', which allows the grain to escape from the measure through chute D into a suitable receptacle. The disk L is of sufficient circumferential length to support the scale-beam during the emptying of the measure, and when the notch l comes opposite the lock-bar it drops, carrying the trip-arm and scale-beam with it, and brings the parts into the position shown in Fig. 1 for a repetition of the operation just described. When the outer end of the scale-beam rises, the pawl U rides one of the teeth t, and when the said beam falls the pawl is carried down and turns the wheel T the distance of one number. When wheel T has made one revolution, it turns wheel T' forward one step, and wheel T' turns wheel T² in the ordinary and well-known manner.

The registering mechanism may be closed or boxed in, as shown in Fig. 2, in the ordinary manner.

Having thus described my invention, what I claim, and desire to secure by Letters Patent, is—

1. The combination, with the vertically-movable measure and the sliding bottom, of the cross-head, the vertical guide-bar connecting the cross-head and the said sliding bottom and permitting a free vertical movement of the measure, and means for moving the cross-head, substantially as described, for the purpose specified.

2. The combination of the vertically-movable measure having a sliding bottom, the cross-head, means for sliding the cross-head back and forth, and the positive connection between the cross-head and sliding bottom, whereby the measure is free to have a vertical movement independent of the cross-head, substantially as and for the purpose set forth.

3. In a grain-measure, the combination, with the vertically-movable measure and the scale-beam supporting the said measure on its inner end, of the revoluble disk L, and the bar M, carried by and movable with the scale-beam, and adapted to travel on a portion of the said disk and hold the measure down when discharging its load, substantially as and for the purpose described.

4. In a grain-measure, the combination, with the vertically-movable measure and the scale-beam supporting the grain-measure on its inner end, of the revoluble disk L, having an approximately radial slot, and the bar M, carried on the outer end of the said scale-beam, and adapted to rest on the disk when the measure is at its lowest position, and adapted to enter the said slot and permit the measure to rise, substantially as and for the purpose described.

5. The combination, with the measure, the scale-beam, and the shaft N, of the idle-pulley O, having a lateral projection, o, the wheel P, the dog p, having one end adapted to rest against shaft N and its other end extending within the path of the projection o, the spring, the trip-arm R, pivoted between its ends to the outer end of the scale-beam, and the bar S, pivotally supported at its inner end and pivotally connected with the upper end of trip-arm R, substantially as set forth.

6. The combination of the measure, the scale-beam, the shafts J and N, the wheels K and P, mounted on the shafts J and N, respectively, and connected to revolve together, the idle-pulley, the dog p, the projection o, the slotted disk L, the lock-bar, and trip-arm, substantially as described.

7. The combination, with the measure, the scale-beam, the shafts J and N, the wheels K and P, the idler O, means for connecting O and P, and the slotted disk L, of the lock-bar and the trip-arm pivotally connected with the scale-beam and having their ends extended upward, and the bar S, whereby the upper ends of the lock-bar and trip-arm are connected together and with the frame of the device, substantially as and for the purpose described.

8. The combination of the measure, the scale-beam, the registering mechanism, the pawl U, the rod U', and the pointer V, having an eye through which the rod U' passes and is guided in its movements, substantially as described.

In testimony whereof I affix my signature in presence of two witnesses.

JOS. GUIDINGER.

Witnesses:
AUGUST KNOLL, Jr.,
HUGO MILL.